April 24, 1934.   A. J. GRANBERG   1,956,282
FLUID METER
Filed July 17, 1931    4 Sheets-Sheet 1

INVENTOR,
Albert J. Granberg
BY
Townsend, Loftus & Abbett
ATTORNEYS.

April 24, 1934.  A. J. GRANBERG  1,956,282
FLUID METER
Filed July 17, 1931  4 Sheets-Sheet 2

INVENTOR.
Albert J. Granberg
BY
Townsend, Loftus & Abbett
ATTORNEYS.

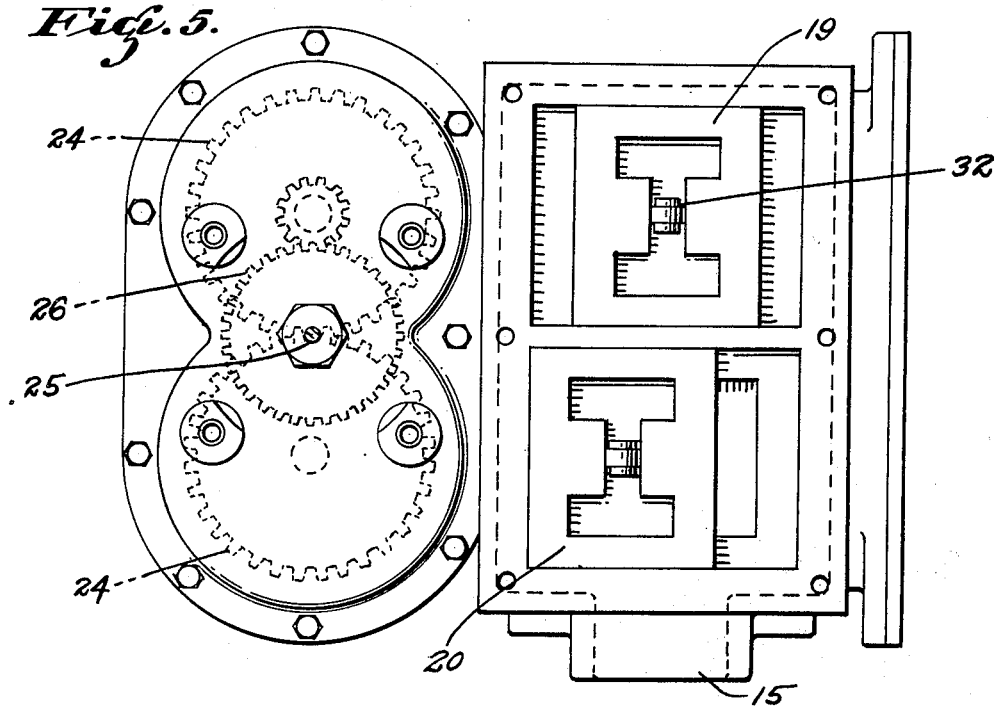
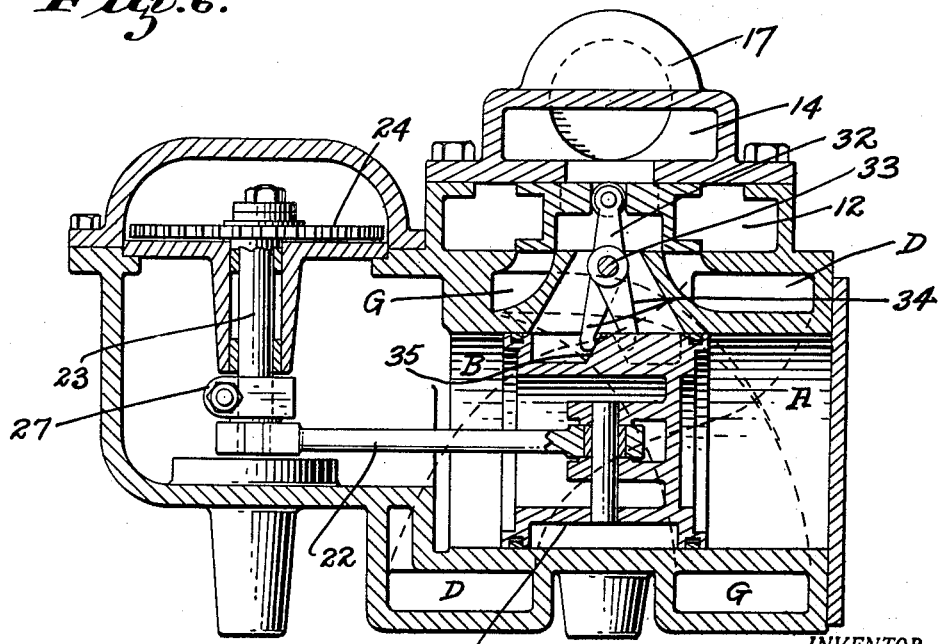

Patented Apr. 24, 1934

1,956,282

UNITED STATES PATENT OFFICE 1,956,282

FLUID METER

Albert J. Granberg, Berkeley, Calif., assignor to Ralph N. Brodie Company, Oakland, Calif., a corporation of California Application July 17, 1931, Serial No. 551,473

5 Claims. (Cl. 73—30)

This invention relates to fluid meters of the displacement type.

It is the principal object of the present invention to provide a generally improved meter of the character referred to wherein the flow of fluid to the metering chambers is controlled by slide valves actuated directly from the pistons, whereby a positive and efficiently operating displacement meter is provided.

In carrying the invention into practice I provide a meter including a meter casing which is formed with a pair of parallel cylinders in which pistons are reciprocably mounted. These pistons are suitably connected to a crank medium which is operated by the reciprocation of the pistons and which in turn operates a counter mechanism which indicates the volume of fluid displaced by operation of the pistons. The pistons divide the cylinders into two metering chambers to which fluid is alternately admitted and discharged. The flow of the fluid to and from these metering chambers is controlled by slide valves operated by the reciprocation of the pistons.

One form which the invention may assume is exemplified in the following description and illustrated by way of example in the accompanying drawings, in which:

Fig. 5 is a plan view with a portion of the casing removed to show the valve chambers.

Fig. 6 is a view similar to Fig. 1 with the piston disposed in a different position.

Figure 1:
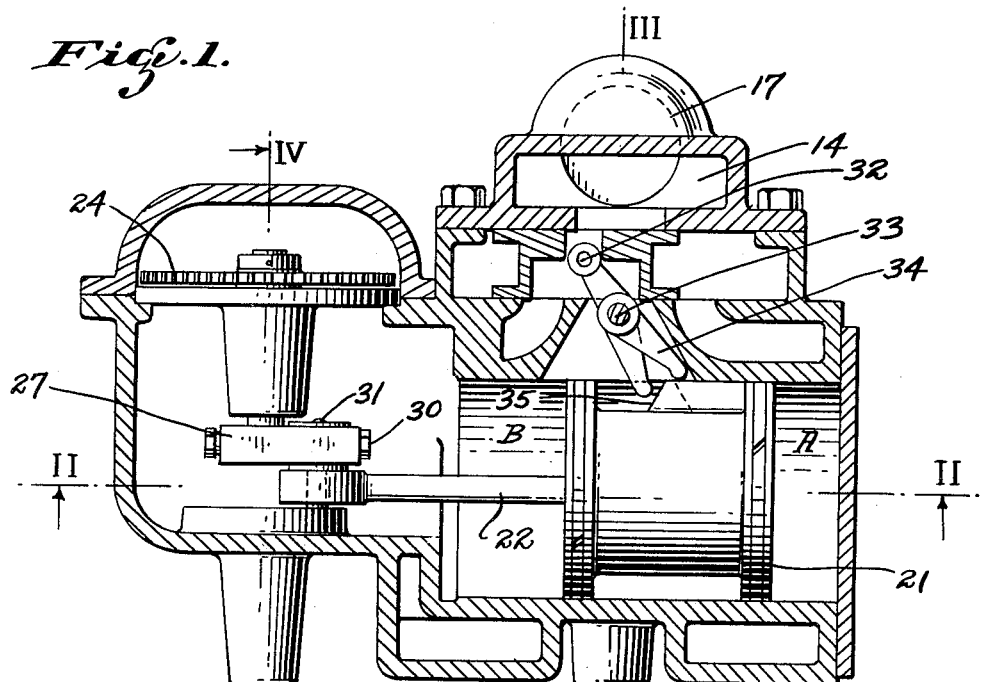
Fig. 1 is a longitudinal sectional view taken on line I—I of Fig. 2.
Figure 2:
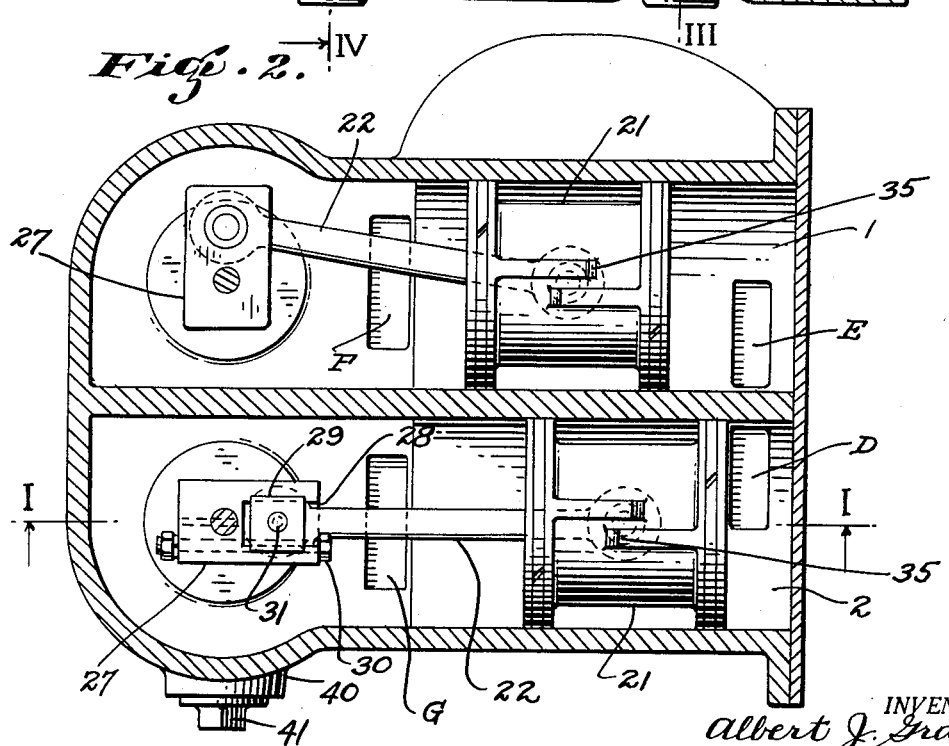
Fig. 2 is a longitudinal sectional view taken on line II—II of Fig. 1.
Figure 3:
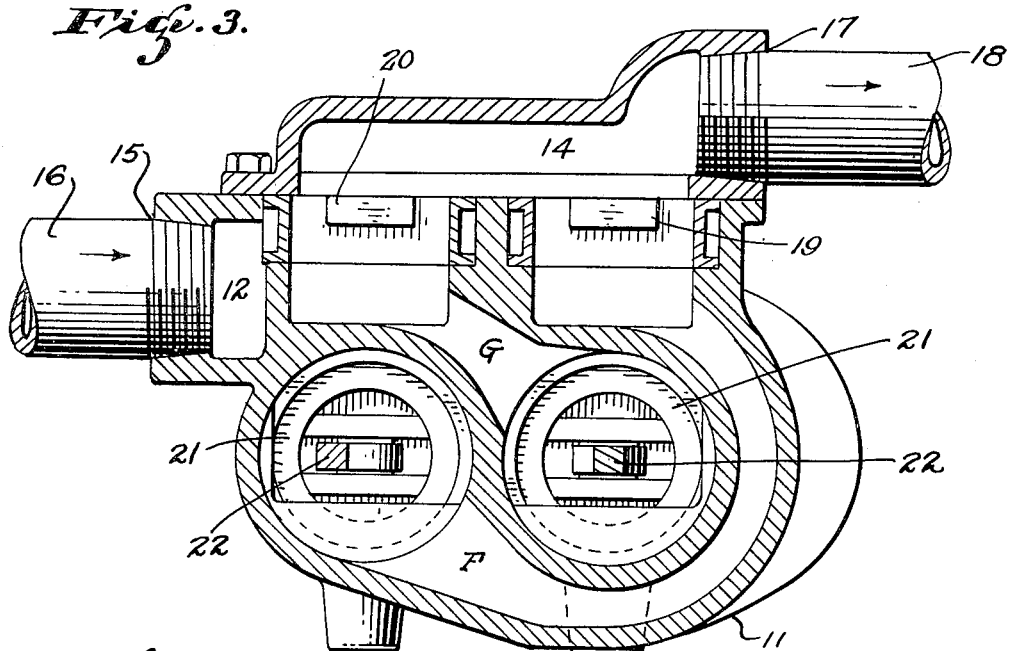
Fig. 3 is a transverse sectional view taken on line III—III of Fig. 1.
Figure 4:
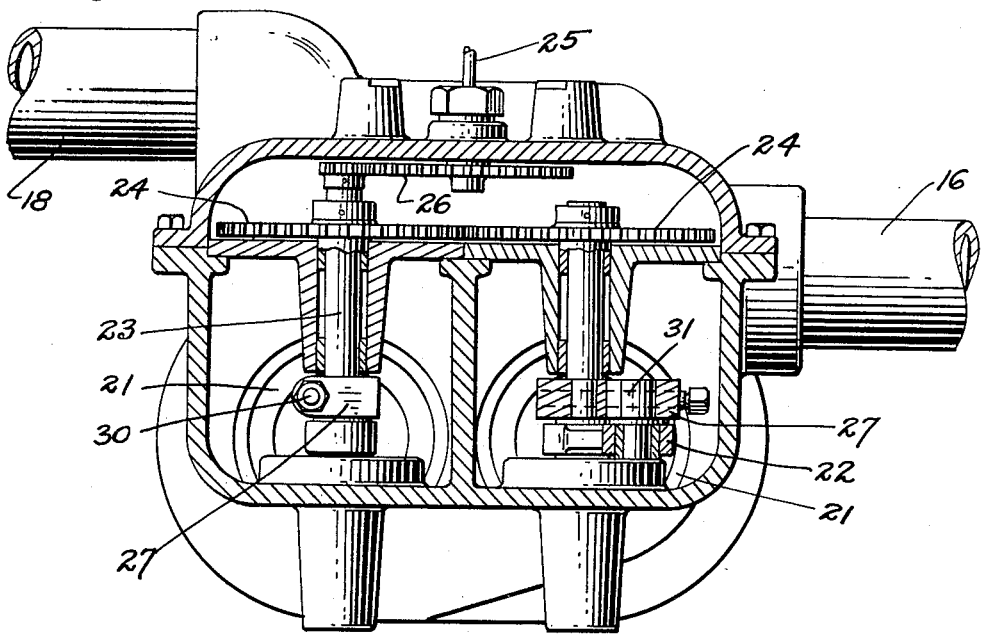
Fig. 4 is a transverse sectional view taken on line IV—IV of Fig. 1.

Referring more particularly to the accompanying drawings, I show a fluid meter comprising a meter casing 11 which is formed with an intake chamber 12 and an exhaust chamber 14. The intake chamber is formed with a suitable intake port 15 which may be connected with a conduit 16. The exhaust chamber 14 is formed with an exhaust port 17 connected with a conduit 18 so that the meter may be interposed in a pipe line to measure the fluid passing therethrough and to indicate the volume thereof in gallons or other suitable units of measure.

The intake chamber is formed with two valve chambers in which are disposed reciprocable slide valves 19 and 20. These slide valves each overlie a metering cylinder, which metering cylinders are horizontally disposed in the casing with their axes in parallelism and at a spaced distance apart. The cylinders are indicated in the drawings as 1 and 2.

Each cylinder is fitted with a reciprocable piston 21 which divides each metering cylinder into two metering chambers A and B. Each piston is fitted pivotally with a connecting rod 22 which extends through the metering chamber B of the cylinder and is pivotally connected with a crank pin which is connected with a crank shaft 23. It will be noticed that the crank shaft of each cylinder is disposed in a crank case which are formed as continuations of the metering chambers B. The crank cases of each cylinder, however, are suitably enclosed so that no communication may be had therebetween.

The upper ends of the crank shafts 23 project upwardly through the top wall of the crank cases and are there fitted with spur gears 24 which are in mesh so that the pistons of the cylinders will operate in synchronism and in overlapping cycles. That is to say, the cranks of the two crank shafts are set at 90 degrees apart as illustrated.

In order to vary the combined displacement of the pistons the connecting rod of one piston, or that in the cylinder 2, is adjustably connected to its associated crank shaft 23 in order that the stroke of the piston in cylinder 2 may be varied and thus vary the displacement of the pistons so that the volume of fluid displaced by the pistons will agree with that indicated by an indicator mechanism driven by the crank shafts. The indicator mechanism is driven by an indicator mechanism drive 25 which is driven from one of the crank shafts through the medium of a train of gears 26.

In order to adjust the stroke of the piston in cylinder 2, the crank shaft 23 which is associated with this cylinder is fitted with a crank throw 27 formed with a radial slot 28 extending inwardly from the outer end thereof. A slide block 29 is reciprocably mounted in this slot 28 for radial movement toward and away from the center of the crank shaft 23. The movement of the slide block 29 is accomplished through the medium of a feed screw 30 rotatably mounted in the crank throw 27 and engaging a threaded semi-cylindrical bore in one edge of the crank throw. The slide block 29 carries a crank pin 31 which is connected to the connecting rod of the piston in cylinder 2 and by turning the feed screw 30 the throw of the crank pin 31 may be varied so as to change the stroke of the piston and thereby vary the displacement of the meter so that the same will agree with the amount indicated by an indicator mechanism driven by the indicator drive mechanism 25.

Each metering chamber of the cylinders communicates with a metering chamber port which are indicated in the drawings as D, E, F and G, the ports E and F communicating with the respective metering chambers of cylinder 1 while the ports D and G communicate with the respective metering chambers of cylinder 2. The admittance and discharge of fluid from these ports is controlled by the two slide valves previously mentioned. These slide valves are arranged in the slide valve chambers which overlie the cylinders, as previously mentioned, one chamber overlying each cylinder. The slide valve 19 overlying cylinder 1 controls the ports D and G of cylinder 2 while the slide valve 20 overlying cylinder 2 controls the ports E and F of cylinder 1. This is most clearly illustrated in the diagrammatic view shown in Fig. 7.

The metering chamber port E of cylinder 1 communicates through a passageway with a port E′ communicating with the valve chamber of the valve 20 while the metering chamber port F of cylinder 1 communicates with a port F″ also communicating with the valve chamber of the valve 20. This valve is so constructed that it covers and uncovers these ports at proper timed intervals so that fluid is alternately admitted through the ports E and F into the metering chambers A and B of cylinder 1.

The port D of the metering chamber A of cylinder 2 communicates through a suitable passageway with a port D′ entering the valve chamber of the valve 19 while the port G of the metering chamber B of cylinder 2 communicates with the valve chamber of valve 19 through a suitable passageway and port G′. The valve 19 acts to uncover and cover the ports D′ and G′ at properly timed intervals so as to alternately admit fluid to the metering chambers A and B of cylinder 2.

To operate the valves each valve is slidably connected at one end to a pivotal lever 32 which is pivoted to the casing intermediate the valve ports as at 33. This lever is provided with two axially spaced projecting fingers 34 which are adapted to be engaged by projections 35 on the adjacent piston so that reciprocation of the pistons will reciprocate the adjacent valves. It should be pointed out that the piston in cylinder 1 actuates the valve 19 which controls the ports of the metering chambers of cylinder 2 while the piston in cylinder 2 actuates the valve 20 which controls the ports of the metering chambers of cylinder 1.

In order to permit fluid to discharge from metering chambers alternately, each valve is formed with a central discharge valve port which is adapted to be in constant communication with the exhaust chamber 14 through the medium of suitable ports in the wall which separates the exhaust chamber from the intake chamber. No communication, however, may be had between the exhaust chamber and the intake chamber through these ports nor are the discharge ports in the valves at any time in communication with the intake chamber. The valves are so constructed that when they uncover one port entering the intake chamber, communication between the other port and the intake chamber is discontinued and this latter port is placed in communication with the valve port and consequently in communication with the exhaust chamber. Therefore, when fluid is being admitted to one metering chamber of one cylinder, fluid is being permitted to discharge from the opposite metering chamber of the same cylinder and therefore the pistons will reciprocate.

As the pistons operate in overlapping cycles due to their being operatively connected as described, when one piston reaches dead center the other piston will be half way through one of its strokes and will act to carry the other piston over dead center and again place it in operation.

Figure 7:
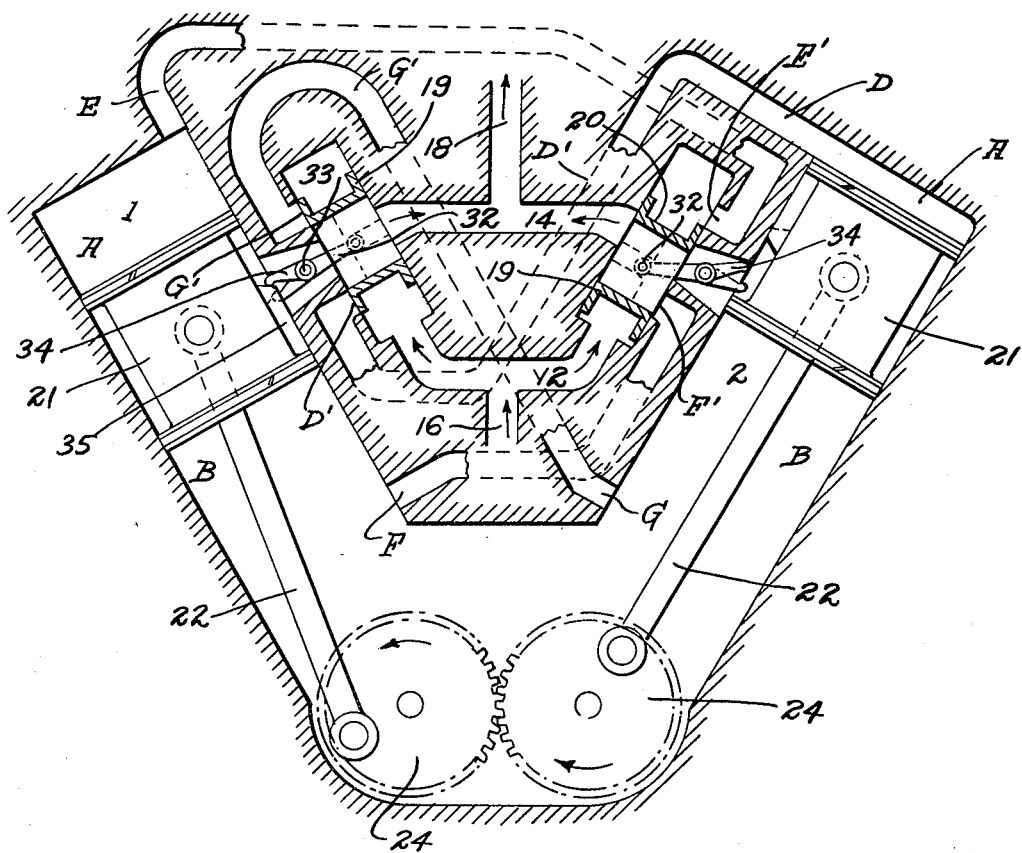
Fig. 7 is a diagrammatic view showing the arrangement of ports and the manner in which the slide valves control the flow of fluid to and from the metering chambers.

In operation of the device, assuming that the pistons are in the positions shown in Fig. 7, in which position the valve 20 has fully uncovered valve port E′ to permit the entrance of fluid to the metering chamber A of cylinder 1 forcing the piston downwardly, at which time the valve is in a position establishing communication between the port F′ and the discharge chamber through the medium of the central valve port which enables fluid to be displaced in metering chamber B by the downward moving piston in cylinder 1 and discharge said fluid to the discharge chamber.

The valve 19, however, which controls the piston in cylinder 2 will be in a position entirely closing both ports D′ and G′ due to the fact that the piston in cylinder 2 is on upper dead center. However, the lugs 35 on the piston in cylinder 1 is just about to engage one of the fingers 34 and further downward movement of this piston will through the medium of these fingers 34 and the lever 32 move the valve to a position uncovering port D′ to admit fluid to the metering chamber A of cylinder 2, which will force the piston downwardly. At the same time the valve port in the valve 19 will register with the port G′ so as to permit fluid from the metering chamber B of cylinder 2 to discharge through the valve 19 to the discharge port.

When the piston in cylinder 1 has reached the end of its downward stroke, the piston in cylinder 2 will have moved the valve 20 to a position covering the ports E′ and F′ and further movement of the piston in cylinder 2 will commence to operate the valve 20 to uncover port F′ and place the metering chamber B of cylinder 1 in comunication with the intake chamber and likewise to place the valve port of the valve 20 into register with the port E′ and permit fluid to be displaced in metering chamber A of cylinder 1 and enable said fluid to discharge through the port E′ to the exhaust chamber through the valve.

In this manner the pistons will operate in overlapping cycles and as they operate they will drive the counter drive mechanism 25 to indicate the volume of fluid displaced. In order that this indicated volume agree exactly with the volume displaced by the pistons, the stroke of the piston in cylinder 1 may be varied through the adjusting mechanism described. Access may be had to this adjusting mechanism through an opening in boss 40 in the meter casing which is normally closed by a screw plug 41.

From the foregoing it is obvious that I have provided a comparatively simple but efficient fluid meter which will be positive in operation and which will efficiently operate to measure liquid passed therethrough.

While I have shown the preferred form of my invention, it is to be understood that various changes may be made in its construction by those skilled in the art without departing from the spirit of the invention as defined in the appended claims.

Having thus described my invention, what I claim and desire to secure by Letters Patent is:

1. A meter comprising a casing having a first and a second cylinder formed therein, a piston in each cylinder dividing the same into two metering chambers, a separate crank shaft for each piston and connecting rods connecting the pistons to their respective crank shafts, a geared connection between said crank shafts whereby the pistons will operate in synchronism and in overlapping cycles, a counter drive mechanism driven by the crank shafts, the metering chamber of each cylinder having a port, said casing being formed with an intake and an exhaust chamber, said casing having passages communicating said ports with said inlet and exhaust chambers, a slide valve, means for operating said valve by movement of the piston of the first cylinder for controlling the flow through said passages to the ports of the metering chambers of the second cylinder, a slide valve, and means for operating said second valve by movement of the piston of the second cylinder for controlling the flow through said passages to the ports of the metering chambers of the first cylinder whereby fluid will be alternately admitted and discharged from opposite metering chambers of said cylinders.

2. A meter comprising a casing having a first and a second cylinder formed therein, said cylinders being arranged in parallelism and disposed horizontally, a piston in each cylinder, a vertical crank shaft for each piston, connecting rods pivotally connecting the pistons to the crank shafts, a geared connection between the crank shafts, said casing being formed with a port for each metering chamber, said casing being formed with an intake and an exhaust chamber, said casing having passages communicating said ports with said inlet and exhaust chamber, a slide valve overlying each cylinder, the slide valve overlying the first cylinder controlling the flow through said passages to the ports of the metering chambers of the second cylinder and the valve overlying the second cylinder controlling the flow through said passages to the ports of the metering chambers of the first cylinder, and means for operating said slide valves by movement of the pistons so as to open and close said ports in timed relation to the piston strokes.

3. In a fluid meter comprising a casing and a pair of pistons reciprocably mounted therein, connecting means between the pistons whereby they will operate in overlapping cycles, means for delivering fluid to opposite ends of said pistons, a slide valve adjacent each piston and adapted to control the flow of fluid to and from the opposite ends of the pistons, a lever pivoted to the casing between each piston and valve and engaging the valve at one end, a pair of fingers on the opposite end of the lever and projecting into the cylinders, and a projection on each piston engageable with said fingers to oscillate said levers and slide said valves when the piston is reciprocated.

4. In a fluid meter comprising a casing and a pair of pistons reciprocably mounted therein, connecting means between the pistons whereby they will operate in overlapping cycles, means for delivering fluid to opposite ends of said pistons, a slide valve adjacent each piston and adapted to control the flow of fluid to and from the opposite ends of the pistons, a lever pivoted to the casing between each piston and valve and engaging the valve at one end, a pair of fingers on the opposite end of the lever and projecting into the cylinders, and a projection on each piston engageable with said fingers to oscillate said levers and slide said valves when the piston is reciprocated, and means for varying the displacement of said pistons whereby to calibrate the meter.

5. A meter comprising a casing having a first and a second cylinder formed therein, a piston in each cylinder dividing the same into two metering chambers, a separate crank shaft for each piston and connecting rods connecting the pistons to their respective crank shafts, a geared connection between said crank shafts whereby the pistons will operate in synchronism and in overlapping cycles, a counter drive mechanism driven by the crank shafts, the metering chamber of each cylinder having a port, said casing being formed with an intake and an exhaust chamber, said casing having passages communicating said ports with said inlet and exhaust chambers, a slide valve, means for operating said valve by movement of the piston of the first cylinder for controlling the flow through said passages to the ports of the metering chambers of the second cylinder, a slide valve, and means for operating said second valve by movement of the piston of the second cylinder for controlling the flow through said passages to the ports of the metering chambers of the first cylinder whereby fluid will be alternately admitted and discharged from opposite metering chambers of said cylinders, and means for varying the stroke of one of said pistons to vary the combined displacement of the pistons whereby to calibrate the meter.

ALBERT J. GRANBERG.